United States Patent Office 3,239,550
Patented Mar. 8, 1966

---

3,239,550
CYCLIC POLYSILOXAZANES
James G. Murray, Scotia, N.Y., assignor to General Electric Company, a corporation of New York
No Drawing. Filed May 21, 1962, Ser. No. 196,439
8 Claims. (Cl. 260—448.2)

This invention is concerned with cyclic organo-polysiloxanes containing a single nitrogen in the ring. More particularly, the invention relates to cyclic compositions of matter (hereinafter called "siloxazanes") of the formula (I) 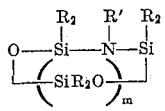

where R is a monovalent organic radical (which may be the same or different), R' is selected from the class consisting of hydrogen and monovalent organic radicals, and $m$ is a whole number equal to from 1 to 4, inclusive.

The aforesaid siloxazanes can be heated at temperatures of from 125–175° C. with from 0.005% to 1%, by weight, based on the weight of the siloxazane, of a basic catalyst such as, potassium hydroxide, to make linear siloxazane polymers of higher molecular weight, which in turn can be compounded with various fillers and cured in the presence of a peroxide such as, benzoyl peroxide, to give heat-hesistant rubbers.

In addition, these siloxazanes can be used to treat reinforcing fillers such as silica aerogel, fume silica, etc., which are to be used as fillers for other organopolysiloxane gums in order to reduce the tendency of these fillers to cause the filled compound to form nervy, rubbery structures prior to vulcanization. This structure formation of a silicone rubber compound containing the fillers makes it extremely difficult to compound the filled silicone gum with additives, such as curing agents, prior to molding the latter to make articles of commerce.

Instead of treating the fillers with the aforesaid siloxazanes, it is also possible to incorporate the siloxazane in a compound composed of the silicone gum and the reinforcing filler, in amounts ranging from about 1 to 15% of the weight of the siloxazane in order to reduce the structure formation of the filled compound. These siloxazanes can also be used to treat various solid surfaces to render the latter water repellent, and despite the presence of the

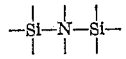

bond, it is found that this bond is considerably more stable due to the presence of siloxy units in the cyclic molecule.

Various methods may be employed in preparing these compositions of matter. One method comprises reacting a compound of the formula

with a polysiloxane of the formula (II) 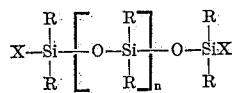

where R and R' have the meanings given above, X is a halogen (e.g., chlorine, bromine, fluorine, etc.), and $n$ is a whole number from 1 to 8. Among the radicals which R and R' may be are, for instance, alkyl including cycloalkyl radicals (e.g., methyl, ethyl, propyl, isopropyl, butyl, hexyl, cyclopentyl, cyclohexyl, etc., radicals); alkenyl including cycloalkenyl radicals (e.g., vinyl, allyl, methallyl, crotyl, cyclopentenyl, cyclohexenyl, etc., radicals); aryl radicals (e.g., phenyl, biphenyl, naphthyl, etc., radicals); aralkyl radicals (e.g., benzyl, phenylethyl, etc., radicals); alkaryl radicals (e.g., tolyl, xylyl, ethylphenyl, etc., radicals); cyanoalkyl (e.g., cyanoethyl, cyanopropyl, etc.) etc. Obviously, R and R' in the above formulas may be the same or different.

Generally, in order to effect reaction, temperatures ranging from room temperature (about 20–30° C.) to as high as 150 to 200° C. may be used. Often catalysts, such as ammonium chloride, copper chloride, etc., are advantageously used. The reaction is caused to take place between a compound having the formula

and the halogeno-terminated organopolysiloxane of Formula II, advantageously in the presence of solvents, such as inert aromatic solvents, for example, benzene, toluene, xylene, etc. Thereafter the desired composition can be isolated by the usual methods of fractional distillation and recrystallization.

In order that those skilled in the art may better understand how the present invention may be practiced, the following examples are given by way of illustration and not by way of limitation. The molecular weight determinations of the compounds were made ebullioscopically in benzene. The methyldichloropolysiloxanes of Formula II used in the following examples have been reported by Patnode and Wilcock, J. Am. Chem. Soc., 68, 358 (1946). The phenylmethyldichloropolysiloxanes of Formula II used were prepared and characterized by Daudt and Hyde, J. Am. Chem. Soc. 74, 386 (1952).

The 1,5-dichloro-1,1,5,5-tetramethyl-3,3-diphenyltrisiloxane used in the succeeding examples was prepared as follows. To a stirred mixture of 129 grams of dimethyldichlorosilane, 79 grams of pyridine, and 1.5 liters of benzene held at 0 to 10° C. was added 108.2 grams diphenylsilanediol over a period of 1.5 hours. The mixture (protected from moisture) was stirred for about 18 hours. The reaction product was then filtered, the filter cake washed with benzene, and the benzene then distilled from the filtrate at reduced pressure. The residue was in turn distilled at a reduced pressure to yield 131.5 grams of the above dichlorosiloxane product boiling at 130–142° C./0.3 mm.

*Example 1*

This example illustrates the preparation of the compound 1,1,3,3,5,5-hexamethyl-4,6-dioxa-2-azacyclohexasilane of the formula (III) 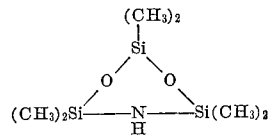

More particularly, ammonia was passed into a solution of 57.1 grams 1,5-dichlorohexamethyltrisiloxane in 150 ml. benzene held at 20–30° C. until no more absorption of ammonia occurred. Ammonium chloride was then removed by filtration. The residue (filtrate) was heated 2 hours on a steam bath to condense any silyl amines. The residue was then distilled under reduced pressure to yield 7.5 grams of a compound of Formula I, boiling at 3,5–37° C./5 mm. There was also obtained the compound 1,1,3,3,5,5,7,7,9,9,11,11 - dodecamethyl - 4,6,10,12 - tetroxa-2,8-diazacyclododecasilane of the formula (IV) 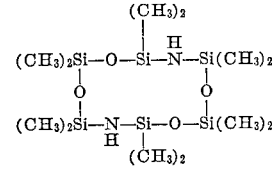

in a yield of about 2.5 grams boiling at 72–75° C./0.1 mm. Analysis of the compound of Formula III showed it to contain 6.25% nitrogen and to have a molecular weight of 230 as contrasted to the theoretical value of 6.32% nitrogen and a molecular weight of 221.49. The analysis of the compound having Formula IV showed it to contain 6.3% nitrogen and to have a molecular weight of 446 as contrasted to the theoretical value of 6.32% nitrogen and a molecular weight of 442.98. Infrared spectra of the products established still further the identity of the above-identified compounds.

*Example 2*

The compound 1,1,3,3,5,5,7,7-octamethyl-4,6,8-trioxa-2-aza-cyclooctasilane having the formula (V) 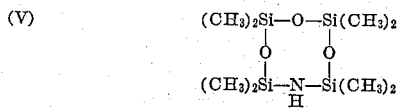

was prepared by passing ammonia rapidly through a solution of 42.5 grams of 1,7-dichlorooctamethyltetrasiloxane held at a temperature of 20–30° C. until no more ammonia was absorbed. The product was then isolated as described in Example 1, and after fractional distillation yielded 18.2 grams of a composition having the Formula V boiling at 78–79° C./10 mm. Analysis of this compound showed it to contain 5.7% nitrogen and to have a molecular weight of 304 as contrasted to the calculated value of 4.74% nitrogen and a molecular weight of 295.65. The infrared spectra of this composition was consistent with the above-identified structure.

*Example 3*

In this example, the compound 1,1,3,3,5,5,7,7,9,9,-decamethyl-4,6,8,10 - tetraoxa - 2 - azacyclodecasilane was prepared by reacting ammonia with a solution of 20.3 grams of 1,9-dichlorodecamethylpentasiloxane in 75 ml. benzene similarly as was done in the preceding examples. The product which was isolated as described in Examples 1 and 2, was fractionally distilled to yield 6.5 grams of a composition having the structure (VI) 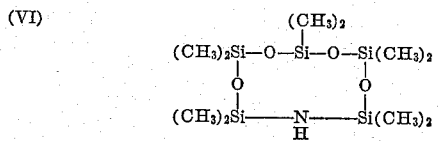

boiling at 81–83° C./3.3 mm. Analysis of the compound showed it to contain 4% nitrogen and to have a molecular weight of 380 as contrasted to the theoretical values of 3.79% nitrogen and a molecular weight of 369.81. Again, the infrared spectra for the composition was consistent with the above-identified structure.

*Example 4*

The compound 1,1,3,3,5,5,7,7,9,9,11,11-dodecamethyl-4,6,8,10,12-pentaoxa-2-azacyclododecasilane having the formula (VII) 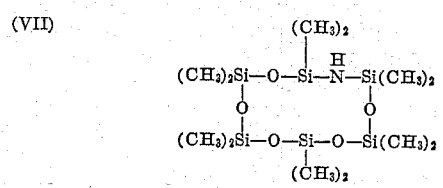

was prepared by reacting ammonia with 9.1 grams of 1,11-dichlorododecamethylhexasiloxane in 75 ml. of benzene similarly as was done in the preceding examples. Distillation of the reaction product yielded 5.3 grams of the composition having the structure represented by Formula VII boiling at 64–65° C./0.1 mm. Analysis of the compound showed it to contain 3.6% nitrogen and to have a molecular weight of 451 as contrasted to the theoretical value of 3.16% nitrogen and a molecular weight of 443.96. The infrared spectra for this composition was consistent with the above-identified structure.

*Example 5*

This example illustrates the preparation of 1,3,5-trimethyl-1,3,5-triphenyl - 4,6 - dioxa - 2 - azacyclohexasilane having the formula (VIII) 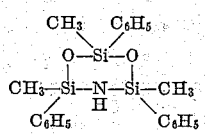

More particularly, anhydrous ammonia was passed rapidly into a solution of 63.2 grams of 1,5-dichloro-1,3,5-triphenyl-1,3,5-trimethyltrisiloxane dissolved in 300 ml. of benzene with rapid stirring, while maintaining a constant temperature by means of an ice bath. After 2.3 hours the ice bath was removed and the ammonia passed into the solution for an additional 2 hours. The mixture was filtered, washed with benzene, and the benzene removed from the filtrate under reduced pressure. The residue was heated at 120° C. at 0.08 mm. for 2 hours and then fractionally distilled to yield 23.4 grams of a composition having Formula VIII boiling at 169–172° C./0.25 mm. Analysis of the compound showed it to contain 3.5% nitrogen and to have a molecular weight of 411, in contrast to the theoretical value of 3.5% nitrogen and a molecular weight of 400. Infrared examination of the product showed its structure to be consistent with the above-identified structure.

*Example 6*

The compound 1,3,5,7-tetramethyl-1,3,5,7-tetraphenyl-4,6,8-trioxa-2-azacyclooctasilane having the formula (IX) 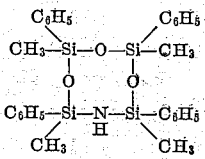

was prepared by passing anhydrous ammonia rapidly into a solution of 69.7 grams of 1,7-dichloro-1,3,5,7-tetraphenyl-1,3,5,7-tetramethyltetrasiloxane in 250 ml. benzene cooled in an ice bath over a period of 1.6 hours. The mixture was then warmed to room temperature (about 27° C.) and ammonia again passed into the solution for an additional 2.5 hours. The mixture was filtered and the benzene distilled from the reaction product under vacuum. The residue was then heated 0.5 hour at 200° C. at about 30 mm. and then vacuum-distilled yielding 36.9 grams of a composition corresponding to Formula IX boiling at 192–202° C./0.15 mm. and having a refractive index $\eta_D^{20}$=1.5574. Analysis of this compound showed it to contain 2.5% nitrogen and to have a molecular weight of 554 as contrasted to the theoretical value of 2.6% nitrogen and a molecular weight of 544. The infrared spectra of this composition was consistent with the above-identified structure.

*Example 7*

The composition 1,1,3,3-tetramethyl-5,5-diphenyl-4,6-dioxa-2-azacyclohexasilane having the formula (X) 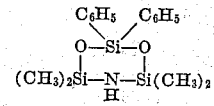

was prepared by placing 300 ml. benzene in a flask equipped with a stirrer, ammonia inlet tube, an addition funnel, and an exit tube which was dipped into mineral oil to prevent the entry of moisture into the flask. This benbene was saturated with anhydrous ammonia and a solution of 113.5 grams of 1,5-dichloro-1,1,5,5-tetramethyl-3, 3-diphenyltrisiloxane in 150 ml. benzene was dropped in over a period of 1 hour, keeping an excess of ammonia present at all times. Ammonia was then passed into the flask for an additional hour after the addition of all the chlorosiloxane. The resulting mixture was allowed to stand for about 120 hours at room temperature and then was filtered, washed with benzene and the benzene removed from the filtrate under reduced pressure. The residue which solidified was distilled, the distilled product recrystallized from cyclohexane three times, and dried in an oven to give 45.4 grams of a product having a melting point of 99–100° C. which was identified as having the structure of Formula X. Analysis of this composition showed it to contain 4.1% nitrogen and to have a molecular weight of 338, as contrasted to the theoretical values of 4.06% nitrogen and a molecular weight of 345.62. The infrared spectra of this composition was consistent with the above-identified structure.

*Example 8*

The composition 2-n-butyl-1,1,3,3,5,5-hexamethyl-4,6-dioxa-2-azacyclohexasilane having the formula (XI) 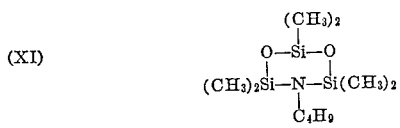

was prepared by making a solution of 29.2 grams n-butylamine in 50 ml. anhydrous diethyl ether and adding this solution over a period of 5 hours to a well stirred mixture of 1,5-dichlorohexamethyltrisiloxane and 40.5 grams of triethylamine in 400 ml. of diethyl ether maintained at a temperature of 25–30° C. The mixture was stirred for an additional hour and after standing for about 18 hours the product was filtered, washed with diethyl ether and the the ether removed under reduced pressure at room temperature. The residue was fractionally distilled to yield 41.2 grams of 1,5-di-n-butylamino-1,1,3,3,5,5-hexamethyltrisiloxane. 30.3 grams of this latter trisiloxane was placed in a distillation vessel together with 0.5 gram anhydrous cupric bromide and heated in an oil bath to 130° C. while slowly distilling the mixture at a reduced pressure of 6 mm. There was thus obtained 19.5 grams of distillate which when re-distilled yielded the composition of Formula XI boiling at 78° C./5.0 mm. Analysis of this compound showed it to contain 30.3% silicon and to have a molecular weight of 290 as contrasted to the theoretical values of 30.36% silicon and a molecular weight of 277.60. The infrared spectra for this composition was consistent with the above-identified structure.

*Example 9*

This example illustrates the preparation of a higher molecular weight polymer from the siloxazane composition of Example 1. More particularly, 10 parts of the compound of Example 1 having Formula III were placed in a sealed tube with 0.05 part tetramethyl ammonium hydroxide and allowed to stand at room temperature (20–30° C.) for about 18 hours. During the first 30 minutes, the fluid oil changed to a highly viscous liquid and after standing the material did not flow. The sealed reaction vessel was opened to yield a slightly tacky, rubbery gum. The intrinsic viscosity of this product when measured in benzene at 25° C. was 0.92. A polydimethylsiloxane of this intrinsic viscosity would represent a number average molecular weight of approximately 350,000. The infrared spectrum of this gum (in carbon disulfide) showed —Si—O—Si— bands at 9.25μ and 9.55μ, and an Si—NH—Si band at 10.65μ. The siloxane bands indicated the absence of long segments of siloxane units in the polymer chain, indicating that the polymer was composed essentially of the recurring structure (XII) 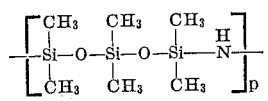

where p is an integer greater than 50. It was also possible that the terminal valences of the siloxazane molecule made up of the above units were terminated by hydrogens or hydroxyls or amino radicals.

It will of course be apparent to those skilled in the art that in addition to the siloxazanes prepared in the foregoing examples other cyclic siloxazanes of varying cyclic length can be prepared within the scope of Formula I without departing from the scope of the invention. Also, the hydrocarbon substitution on the silicon and nitrogen atom of the cyclic siloxazanes can be varied consistent with the various groups which R and R′ may represent. Thus, the compositions of Examples 1 to 4 can be varied so that the methyl groups are replaced by other hydrocarbon radicals, e.g., ethyl radicals, propyl radicals, phenyl radicals, cyanoethyl radicals, mixtures of such radicals, etc. Variation can also be introduced into the compositions of Examples 1 to 7 by replacing the hydrogen on the nitrogen atom of these compounds with monovalent hydrocarbon radicals or cyanoalkyl radicals which R′ may represent, many examples of which have been given above.

What I claim as new and desire to secure by Letters Patent of the United States is:

1. A cyclic organopolysiloxane containing a single nitrogen in the ring selected from the class consisting of 1,1,3,3,5,5,7,7-octamethyl-4,6,8-trioxa-2 - azacyclooctasilane; 1,1,3,3,5,5,7,7,9,9-decamethyl-4,6,8,10 - tetraoxa - 2-azacyclodecasilane; 1,1,3,3,5,5,7,7,9,9,11,11-dodecamethyl-4,6,8,10,12-pentaoxa-2-azacyclododecasilane; 1,3,5 - trimethyl-1,3,5-triphenyl-4,6-dioxa-2-azacyclohexasilane; 1,3,5,7-tetramethyl-1,3,5,7-tetraphenyl-4,6,8-trioxa-2-azacyclooctasilane; 1,1,3,3-tetramethyl-5,5-diphenyl-4,6-dioxa-2-azacyclohexasilane; and 2-n-butyl-1,1,3,3,5,5-hexamethyl-4,6-dioxa-2-azacyclohexasilane.

2. A composition of mattter having the formula

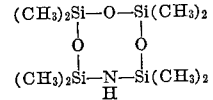

3. A composition of matter having the formula

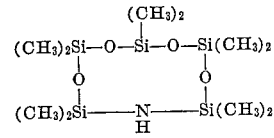

4. A composition of matter having the formula

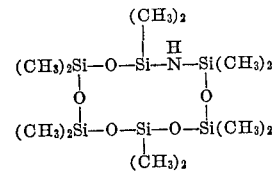

5. A composition of matter having the formula

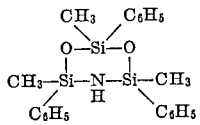

6. A composition of matter having the formula
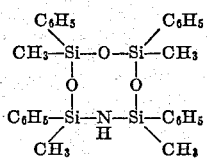
7. A composition of matter having the formula
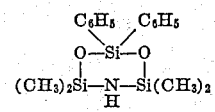
8. A composition of matter having the formula
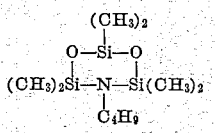
References Cited by the Examiner
UNITED STATES PATENTS
| | | | |
|---|---|---|---|
| 2,503,919 | 4/1950 | Patnode | 260—448.2 |
| 2,676,163 | 4/1954 | Speier | 260—448.2 |
| 2,865,918 | 12/1958 | Hurwitz et al. | 260—448.2 |
OTHER REFERENCES
Sokolov: 54 Chem. Abstr. 8603 (1960).
TOBIAS E. LEVOW, *Primary Examiner.*
SAMUEL A. BLECH, *Examiner.*